(12) United States Patent
Parrault

(10) Patent No.: US 6,724,103 B2
(45) Date of Patent: Apr. 20, 2004

(54) CONTACT-FREE PORTABLE OBJECT COMPRISING ONE OR SEVERAL CONTACT-FREE PERIPHERAL DEVICE

(75) Inventor: Olivier Parrault, Golfe Juan (FR)

(73) Assignee: Ask S.A., Sophia Antipolis (FR)

( * ) Notice: Subject to any disclaimer, the term of this patent is extended or adjusted under 35 U.S.C. 154(b) by 34 days.

(21) Appl. No.: 10/069,378
(22) PCT Filed: Jun. 26, 2001
(86) PCT No.: PCT/FR01/02011
§ 371 (c)(1),
(2), (4) Date: Feb. 25, 2002
(87) PCT Pub. No.: WO02/01497
PCT Pub. Date: Jan. 3, 2002

(65) Prior Publication Data
US 2002/0105232 A1 Aug. 8, 2002

(30) Foreign Application Priority Data
Jun. 29, 2000 (FR) .............................. 00 08439

(51) Int. Cl.⁷ .............................................. H01F 27/42
(52) U.S. Cl. ..................... 307/104; 235/492; 343/856
(58) Field of Search ...................... 307/104; 235/491, 235/492; 343/856, 857, 895

(56) References Cited

U.S. PATENT DOCUMENTS

| 4,277,837 | A | * | 7/1981 | Stuckert | 235/380 |
|---|---|---|---|---|---|
| 4,506,148 | A | * | 3/1985 | Berthold et al. | 235/380 |
| 4,851,654 | A | | 7/1989 | Nitta | 235/492 |
| 5,198,647 | A | | 3/1993 | Mizuta | 235/449 |
| 5,896,111 | A | * | 4/1999 | Houdeau et al. | 343/867 |
| 6,019,284 | A | * | 2/2000 | Freeman et al. | 235/380 |
| 6,223,990 | B1 | * | 5/2001 | Kamei | 235/492 |
| 6,236,220 | B1 | * | 5/2001 | Enguent | 324/652 |
| 6,257,486 | B1 | * | 7/2001 | Teicher et al. | 235/380 |
| 6,367,701 | B1 | * | 4/2002 | Fries | 235/486 |

FOREIGN PATENT DOCUMENTS

| EP | 0 977 145 | 2/2000 |
|---|---|---|
| FR | FR 2 615 984 | 12/1988 |
| WO | WO 96/03713 | 2/1996 |
| WO | WO 99/38117 | 7/1999 |

* cited by examiner

Primary Examiner—Gregory J. Toatley, Jr.
Assistant Examiner—Sharon A. Polk
(74) Attorney, Agent, or Firm—James C. Lydon

(57) ABSTRACT

A portable contactless object (10) featuring a main chip (12) and a main antenna (14) enabling communication between the chip and the reader associated with the portable contactless object. This portable contactless object also features at least one contactless peripheral device (16), having a function different than that of the main chip not connected by ohmic contact to the latter and requiring only a small amount of energy to operate.

13 Claims, 2 Drawing Sheets

CONTACT-FREE PORTABLE OBJECT COMPRISING ONE OR SEVERAL CONTACT-FREE PERIPHERAL DEVICE

This application is a U.S. National Stage of International Application PCT/FR01/02011, filed Jun. 26, 2001 and published on Jan. 3, 2002 in the French Language.

TECHNICAL FIELD

The present invention relates to portable objects and more particularly to a contactless portable object featuring at least one peripheral which does not have ohmic contact with the main chip.

BACKGROUND ART

Portable objects, such as contactless smart cards, are currently widely used in numerous applications. It generally entails ISO format cards which are coupled to readers, through which they are remotely energized, that is, by which they receive energy in the form of a magnetic field and with which they communicate. In public transport sectors, such means have also be implemented in the form of ISO cards or in a smaller format such as tickets. Users present the subscription cards in front of readers in order to gain access to public transport. The communication which is established between the card and the reader enables user recognition and the cost of the trip to be deducted from the user's account.

These means have also been developed as a means of payment. This is the case, for example, of the electronic wallet. The latter can be used to pay for small purchases in shops. It consists of a smart card. This card is credited in a specialized distributor. The user may thus use it to pay for purchases by presenting it in front of a reader. The communication established between the card and the reader debits the sum corresponding to the purchase.

Many companies has also developed identification means for their personnel using contactless smart cards. Passing the card in front of a reader allows the cardholder to be identified, and then to be granted or denied access to a controlled access zone. The same card can also be used by employees to "punch in".

The increasing use of smart card technology has given rise to new needs.

The first of these needs is the possibility to be able to read the information directly on the contactless portable object. The user wants to be able to consult the information contained in the smart card without having to place the card in the field of a reader, and then read the information directly on the reader's display screen. This problem is encountered, for example, when using the electronic wallet. The user can only consult the balance when he/she transfers money to the card or when making a transaction, that is when power is supplied to the card when it is placed in the magnetic field emitted by the reader.

A means for eliminating these drawbacks is available on the market. This means is a case designed for electronic wallet cards which features a display screen allowing the user to consult the card balance at all times. By inserting the latter into the case, contact is made between the card's chip and that of the case. The communication established via the contact results in the balance being displayed on the case's display screen. This technology, however, presents several drawbacks. The first of these inconveniences is that the case requires an internal power source allowing the case and the communication between the card and the case to function. This power source is generally a battery. This battery must thus be changed regularly when depleted. The second drawback resides in the fact that the case only accepts cards that are specifically configured to operate with it. As such, several cards cannot be used with it.

A second need is the possibility to use the same card for several applications. One can imagine that just one card could communicate with different readers. As such, a card may be designed to operate with different systems. Indeed, a credit card operating in automatic teller machines may be used as an electronic wallet. In the same respect, a contactless transport card may be used for purchases of small amounts. The same card thus becomes an accessory capable of being used on a daily basis in several different applications.

A third need may be to incorporate a small keyboard onto the contactless smart card enabling data to be entered during a transaction between the card and a terminal. Such a keyboard would be placed on the body of the smart card.

The cards currently available on the market feature only one main chip enabling them to communicate with only one type of system.

Furthermore, these secondary functions require an energy source to operate when the card is in the magnetic field emitted by the reader with which it communicates.

Finally, the use of peripherals to perform these functions may lead to interference in the main chip's operation and particularly during communication between the latter and its associated reader.

DISCLOSURE OF THE INVENTION

The purpose of the invention is to mitigate these drawbacks by supplying a portable object having several independent functions which are able to communicate with several different systems, owing to one or more independent peripherals, these peripherals only requiring a small amount of energy to operate and having only a slight influence on the operation of the main chip.

The present invention concerns a contactless portable object featuring a main chip and a main antenna enabling communication between the chip and the reader associated with the portable contactless object. This portable contactless object also features at least one contactless peripheral device, having a function different than that of the main chip not connected by ohmic contact to the latter and requiring only a small amount of energy to operate.

According to a specific embodiment, the invention concerns a contactless smart card featuring a secondary chip independent from the main chip and communicating with a reader different than that of the main chip.

BRIEF DESCRIPTION OF THE FIGURES

The purposes, objects and characteristics of the invention will become more apparent from the following description when taken in conjunction with the accompanying drawings in which.

DETAILED DESCRIPTION OF THE INVENTION

Figure 1:
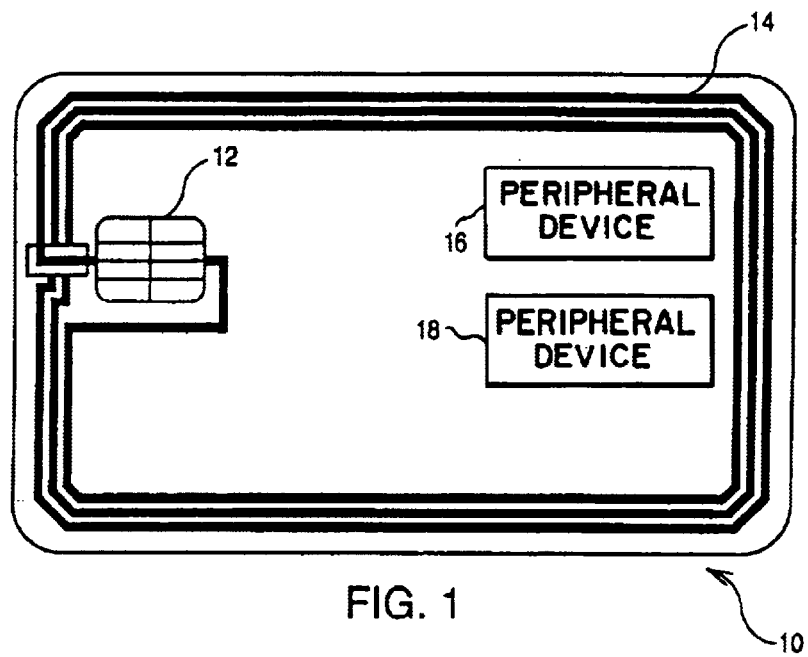
FIG. 1 represents a contactless portable object featuring a plurality of peripheral devices.

FIG. 1 represents an ISO format contactless smart card. The card 10 includes a main chip 12. This chip dialogs with a reader through a main antenna 14. When the card is placed in the magnetic field generated by the reader, electromagnetic coupling occurs between the chip 12 and the reader. Then, the data and the energy transit between the chip and the reader by means of their respective antenna. The main antenna 14 consists of spires of increasing circumferences. Both ends of this antenna are connected to the chip 12. The smart card 10 also includes two peripheral devices 16 and 18. These peripheral devices may be of the same type or of different types. They are connected electrically to the main chip and are independent of one another. According to other embodiments, the card may feature one single peripheral device or more than two, depending on requirements.

Figure 2:
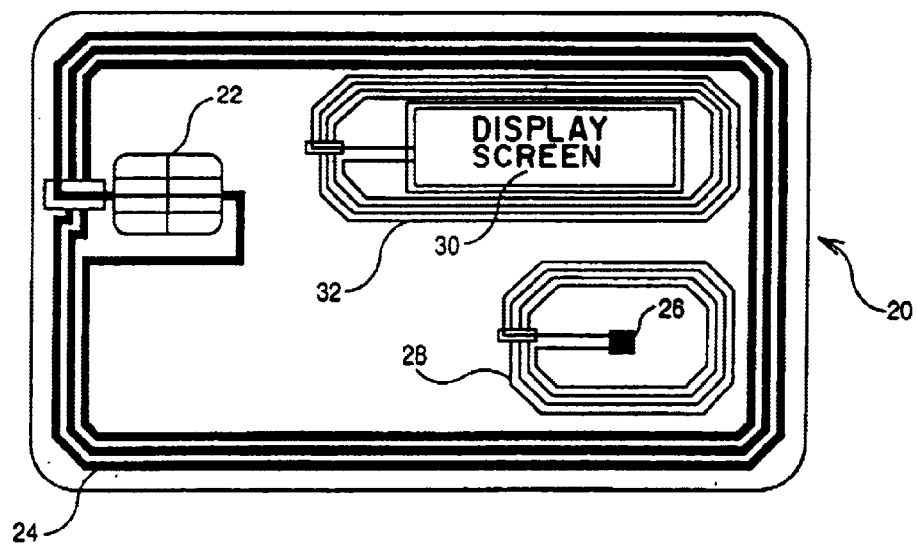
FIG. 2 represents a contactless portable object featuring a secondary chip and a display device.

FIG. 2 represents an example of an ISO format smart card featuring two peripherals of different nature. The smart card 20 includes a main chip 22 connected to a main antenna 24. This card also includes a secondary chip 26 connected to a flat coil 28. It also features a peripheral display device consisting of a chip (not visible), a screen 30 and a flat coil 32 enabling the peripheral display device to receive the data and energy sent by the reader or the main chip.

The size of the flat coil varies according to the specific characteristics of the peripheral to which it is connected. It can thus be seen that flat coil 28 is smaller in size than flat coil 32. Furthermore, the size also depends on the specific characteristics of the card with which the peripheral operates. Regardless of the peripheral, it can be noted that there is no direct electrical wire connection neither with the main chip 22, or with its antenna 24.

Figure 3:
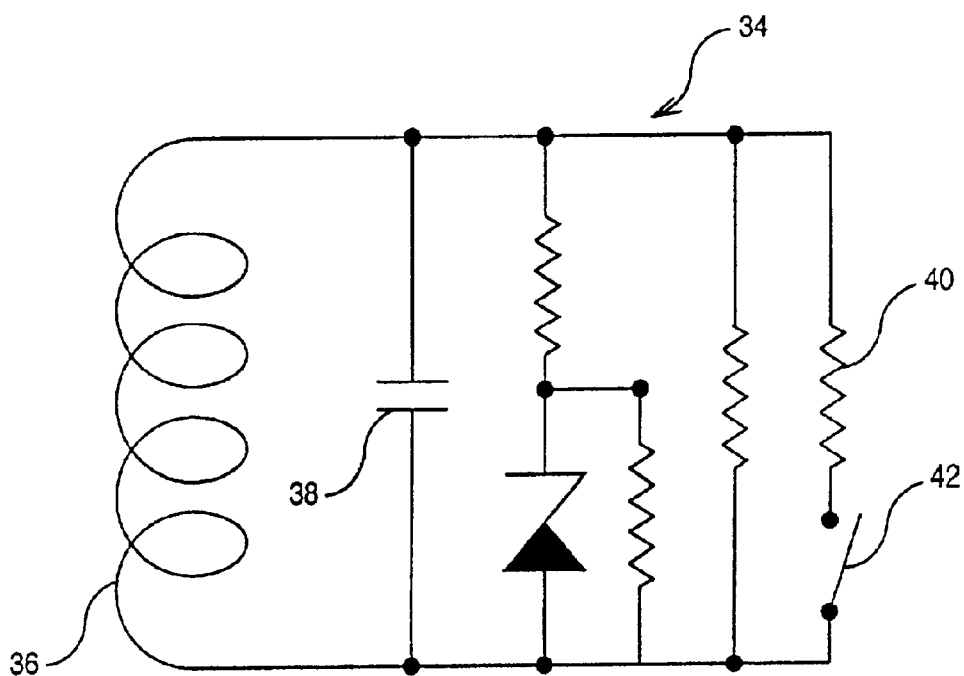
FIG. 3 represents the electrical schematic diagram of a contactless smart card.

FIG. 3 represents the electrical diagram of a contactless smart card 34. The card's electrical circuit includes the main antenna 36 or coupling antenna, at least one capacitor 38 and several resistors, including at least one resistor 40, and one electronic switch 42. The role of capacitor 40 is to supply a tuning capacitor enabling the contactless smart card to resonate with the reader when it is placed in the magnetic field produced by the latter. The frequency at which resonance occurs, that is the frequency at which the smart card's circuit and the reader are tuned, is equal to 13.56 Megahertz (MHz) in accordance with current standards. The resistor 40 may be switched by an electronic switch 42 inside the chip, in order to generate a retromodulation subcarrier frequency between the smart card and the reader. According to a specific example which corresponds to current standards, the value of the retromodulation subcarrier frequency is 847 Kilohertz (kHz). This retromodulation subcarrier frequency enables the smart card to send information to the reader.

Figure 4:
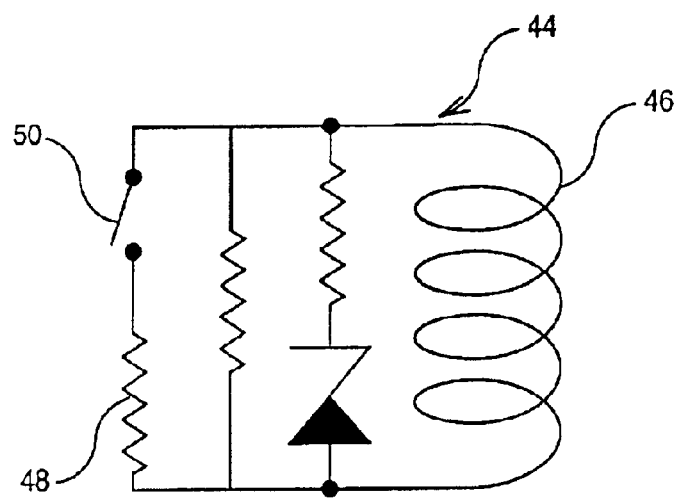
FIG. 4 represents the circuit diagram of a peripheral device.

FIG. 4 represents the electrical diagram of a peripheral device 44. The latter features a flat coil 46, several resistors modeling the loads, including a resistor 48 and an electronic switch 50. The circuit of the peripheral device 44 does not have a tuning capacitor. It thus cannot operate as a standalone device with a useable yield from the energy transmitted by the reader. It must thus use the overvoltage associated with the tuning between the contactless smart card and its reader, through coupling with the main antenna circuit. The principle is thus to use the contactless smart card's tuned main circuit as a transformer primary. The flat coil 46 of the peripheral device thus forms the secondary of this transformer and receives the energy and the data through electromagnetic coupling. The resistor 48, switched by 50, allows the impedance of the circuit to be modified in order to generate a retromodulation subcarrier frequency. Actually, according to a specific operating mode, the impedance of the peripheral device can be varied in order to transmit a response to the reader by retromodulation.

As with all transformers, the impedance presented by the peripheral device's electronics can be compared to the impedance presented from the chip on the main antenna of the contactless card, on the basis of a coupling mutual surge impedance m between the main antenna and the flat coil, and the ratio $n1/n2$, $n1$ being the number of turns of the contactless card's main antenna and $n2$ being the number of turns of the antenna of the peripheral device.

If the peripheral device has a strong impedance and a very weak parasite capacitance upstream of the rectifier, it may be energized when the contactless card is within the reader's magnetic field without significantly downgrading the latter's operation.

According to an operating mode of the peripheral device, the latter exploits the data supplied by the contactless card's chip in the form of a specific instruction emitted by the main antenna. This instruction is generated once the transaction between the contactless card and the reader is accomplished.

According to another operating mode of said peripheral device, the latter can exploit data emitted by the reader simultaneously with the energy and transmitted in amplitude modulation to the contactless card, then emitted by the card's main antenna.

According to a specific embodiment, the circuit of the peripheral device features a capacitor contributing to the overall tuning. This capacitor may accumulate with the tuning capacitor of the main chip to provide a global coupling capacity enabling the circuits of the main chip, the peripheral device and the reader to be tuned to the working frequency of the reader. If several peripheral devices are placed on the contactless smart card, the capacities of the peripheral devices and the main chip accumulate to supply the global tuning capacity. The tuning capacitor of the peripheral is generally weaker than that of the main chip such that 75% of the overall capacity is distributed to the capacitor of the main chip and 25% to the capacitor of the peripheral device. The global tuning capacity also depends on the coupling mutual and is associated with the number of turns of the main antenna and the antennas of the peripheral devices.

The peripheral device can operate with the same reader as the main chip at a frequency identical to that of the main chip.

The peripheral device can operate with a reader specific to the same frequency as that of the main chip.

In order to obtain a global coupling frequency of 13.56 MHz, the natural resonant frequency of the various circuits present on the card is necessarily higher than the working frequency. According to another embodiment, the peripheral device presents a tuning capacitor enabling it to be coupled directly to a specific reader. In this case, the coupling frequency is different and greater than that of the main chip.

The peripheral devices may be of different types. According to an initial embodiment, this device is a secondary chip having its own instructions. This chip can dialog with the same reader as the main chip or with a specific reader.

According to a second embodiment, the peripheral device can be a display device such as shown in FIG. 2. This device displays the information resulting from the dialog between the main chip and the reader. This display device can display the amount of money remaining on the contactless smart card, if the latter is an electronic wallet. It can also display information related to card operation. According to a specific embodiment, the display maintains an after-image which allows the user to see the information at all times, between two transactions.

According to a third embodiment, the peripheral device is a keyboard. The keyboard is preferably a numeric keypad. This function can be of particular interest when the contactless smart card is used as an electronic wallet. Such a device can be used to enter the amount of money a user wants to transfer to the electronic wallet from a distributor. Such a keyboard may also be used to enter an access code. The operation of such a peripheral device only requires that the contactless object remain present in the reader's field during the input operation.

The peripheral device, operating without ohmic contact, may be built into the contactless portable object during its fabrication; the flat coil of the peripheral device is thus in the same plane as the main antenna.

According to another embodiment, the peripheral device may be attached to the portable object once it is fabricated. In this case, the peripheral device can be removed from the portable object.

In the case where the peripheral device is removable, the reception of data and energy by the latter can only take place near the portable object and when it is placed in the magnetic field emitted by the reader. Furthermore, in order to be able to emit a response via retromodulation, the peripheral device must be placed near the contactless portable object.

In summary, each of the component peripheral devices is independent and is not connected to the main chip of the contactless portable object, and thus has no impact on either the operation of the main chip or on the operation of the other peripheral devices of the portable object, nor on the transactions which take place between the main chip, the other peripheral devices and their readers. In this manner, in the case where a peripheral device is physically separated from the contactless portable object, its malfunction has no impact on the functionality of the other elements of the contactless portable object, whether it be the main chip or the other peripheral devices. The user can thus always use the functions of the main chip and the other peripheral devices located on the card. As far as the faulty device is concerned, if it is added to the contactless portable object, it can be changed for a new peripheral device.

What is claimed is:
1. A contactless portable object comprising
   a main chip,
   a main antenna enabling communication between said chip and a reader associated with said contactless portable object,
   at least one contactless peripheral device, having a function different than that of the main chip, not connected by ohmic contact to the latter and requiring only a small amount of energy to operate,
   wherein said peripheral device can send a response to said portable object reader by using retromodulation, through a flat coil, coupled to the main antenna of said portable object.
2. The portable object of claim 1, wherein said peripheral device includes a means for receiving energy and data.
3. The portable object of claim 2, wherein said means for receiving energy and data is a flat coil.
4. The portable object of claim 3, wherein said flat coil functions as a transformer secondary, the primary of which is formed by said main antenna, when the latter receives energy and data from a reader of said portable object through electromagnetic coupling.
5. The portable object of claim 4, wherein the energy and said data transmitted by said main antenna are generated by said portable object reader.
6. The portable object of claim 4, wherein said data transmitted by said main antenna are generated by the main chip of said portable object.
7. The portable object of claim 1, wherein said peripheral device includes a tuning capacitor enabling said device to be coupled to a reader.
8. The portable object of claim 7, wherein the coupling of the device is obtained by combining tuning capacitors of said device and that of said main chip.
9. The portable object of claim 1, wherein said contactless peripheral device is a display device.
10. The portable object of claim 1, wherein said contactless peripheral device is a secondary chip.
11. The portable object of claim 1, wherein said contactless peripheral device is a keyboard.
12. The portable object of claim 1, wherein said peripheral device is built into said portable object, said flat coil being in the same plane as said main antenna of said portable object.
13. The portable object of claim 1, wherein said peripheral device is removable from said portable object.

* * * * *